United States Patent [19]

Wells et al.

[11] Patent Number: 5,171,540
[45] Date of Patent: Dec. 15, 1992

[54] CATALYST REGENERATION

[75] Inventors: Jan W. Wells; Philip V. Steed, both of Bartlesville, Okla.

[73] Assignee: Phillips Petroleum Company, Bartlesville, Okla.

[21] Appl. No.: 660,210

[22] Filed: Feb. 25, 1991

[51] Int. Cl.$^5$ ............... B01J 20/34; B01J 38/30; F23D 14/48
[52] U.S. Cl. ..................... 422/143; 422/144; 422/310; 502/41; 502/42; 639/589; 639/602; 639/DIG. 19
[58] Field of Search .......... 422/143, 144, 310; 502/49, 42, 41; 208/164; 239/DIG. 19, 602, 589

[56] References Cited

U.S. PATENT DOCUMENTS

| | | | |
|---|---|---|---|
| 2,620,967 | 11/1952 | Worn | 230/101 |
| 2,849,381 | 8/1958 | Berg | 196/52 |
| 3,040,439 | 6/1962 | Frost | 34/57 |
| 3,053,642 | 9/1962 | Huntley et al. | 23/288 |
| 3,154,141 | 10/1964 | Huet | 165/185 |
| 3,490,700 | 1/1970 | Kern, Jr. | 239/499 |
| 3,974,091 | 8/1976 | Parker et al. | 252/417 |
| 4,150,090 | 4/1979 | Murphy et al. | 422/144 |
| 4,322,384 | 3/1982 | Sutton | 422/144 |
| 4,346,848 | 8/1982 | Malcolm | 239/596 |
| 4,439,401 | 3/1984 | Voll et al. | 422/150 |
| 4,443,551 | 4/1984 | Limetti et al. | 502/41 |
| 4,545,959 | 10/1985 | Schilling et al. | 422/142 |
| 4,721,603 | 1/1988 | Krug et al. | 422/147 |
| 4,738,830 | 4/1988 | Rahlwes et al. | 422/144 |
| 4,843,050 | 6/1989 | Rahlwes et al. | 502/41 |

OTHER PUBLICATIONS

G. G. Brown et al. "Unit Operations," John Wiley & Sons, 1950, p. 24.
"Standard Specification for Welded and Seamless Carbon Steel and Austenitic Stainless Steel Pipe Nipples," ASTM, Designation A733-86, vol. 1.01 Steel-Piping, Tubing, Fittings, 1989.
J. S. Clarke, "How To Combat Erosion in Fluid Cat Crackers," O&GJ., 51(46) 262-276, Mar. 23, 1953.

*Primary Examiner*—Robert J. Warden
*Assistant Examiner*—T. A. Trembley
*Attorney, Agent, or Firm*—Charles W. Stewart

[57] ABSTRACT

Catalytic regenerators, nozzle designs and processes suitable for introducing regeneration air into a catalytic cracking unit which substantially reduce erosion induced nozzle failures include a plurality of nozzle elements having a roughness defined upon the outside surface of said nozzle elements so as to reduce erosion due to the impact of fluidized catalyst particles within the catalytic regenerator.

8 Claims, 2 Drawing Sheets

CATALYST REGENERATION

BACKGROUND OF THE INVENTION

The present invention relates generally to certain aspects of a catalyst regenerator apparatus in a fluidized catalytic cracking unit. In other aspects, this invention relates to improved methods of and apparatus for the regeneration of catalytic cracking catalyst.

In the catalytic cracking process, high boiling range petroleum fractions, which principally comprise high molecular weight hydrocarbons, are broken up or cracked to form lower boiling range fractions comprising lower molecular weight saturated or unsaturated hydrocarbons. The apparatus for practicing this process, in essence, comprises a reactor, a regenerator, a catalyst circulation system, and a fractionation system. Feedstock is injected into a riser line where it contacts and mixes with hot, freshly regenerated catalyst and passes to the reactor. Cracking takes place in the riser and in the reactor. In many catalytic cracking designs, the cracking reactions take place in a single riser-reactor which serves as the reactor.

As a result of the cracking, the catalyst becomes coked with carbonaceous deposits and loses much of its activity. In order to restore the lost catalyst activity, the spent catalyst is transferred, often pneumatically or by gravity, to the regenerator where it is fluidized and where the coke deposits are burned off under carefully controlled operating conditions.

In the regenerator vessel to which the spent catalyst is transferred, oxygen-containing combustion gas, which generally, but not necessarily, is atmospheric air, is introduced by way of a gas distribution apparatus. This combustion gas is used to fluidize the catalyst and to provide oxygen for the burning of coke off the spent cracking catalyst thereby restoring its activity. The combustion gas can be supplied by numerous means such as, for example, perforated grid plates, pipe grids, single and multiple concentric perforated rings, and christmas trees. An important function of the gas distribution apparatus is to provide an uniform distribution of combustion gas having the appropriate flow conditions, which include such factors as proper velocity and energy profiles and orifice or nozzle pressure drop, for effective fluidization and regeneration of the spent cracking catalyst.

As a part of the gas distribution apparatus, there are often incorporated nozzles or nipples by which gas is discharged into the fluidized catalyst bed of the regenerator. Because of the abrasive action of the fluidized catalyst and high velocity flow of combustion gas within the regenerator, operators of catalytic cracking units commonly encounter severe erosion of the air distribution apparatus and the attaching parts which include the nozzles and nipples. A problem that often occurs, and which is addressed by the present invention, is the severe erosion of the gas nozzles or nipples caused by the impact of fluidized catalyst against their outside surfaces. A result that can occur from excessive nozzle erosion is inefficient catalyst regeneration caused by an upsetting and alteration of air distribution profile within the regenerator. In certain circumstances, the erosion can be so severe that premature shutdowns of the catalytic cracker or shorter time intervals between maintenance shutdowns are caused resulting in loss of production and increased maintenance costs. By reducing the rate of nozzle erosion, the useful life of the gas nozzles can be increased thereby providing for lower replacement costs and potentially longer intervals between maintenance shutdowns. A further benefit from the reduction of gas nozzle erosion is a decrease in catalyst attrition losses.

OBJECTS OF THE INVENTION

It is thus an object of this invention to provide an improved catalyst regenerator in a catalytic cracking unit.

It is a further object of this invention to provide improved gas distribution nozzles for use in the catalyst regenerator of a catalytic cracking unit.

A still further object of this invention is to provide a method for introducing combustion gas into a fluidized bed of cracking catalyst to prevent or reduce gas nozzle erosion.

Yet another object of this invention is to extend the intervals between fluidized catalytic cracking unit shutdowns, reduce maintenance costs, and increase the efficiency of operation of such units.

SUMMARY OF THE INVENTION

According to one embodiment of the invention, an improved nozzle is provided as a part of a gas distribution apparatus, the nozzle having a roughened outside surface pattern formed thereon which provides for a reduction in gas nozzle erosion due to the erosion effects of a fluidized catalyst bed.

A further embodiment of this invention is an improved process for regenerating coked catalyst by use of a nozzle having a roughened outside surface for introducing oxygen-containing combustion gas therethrough into a fluidized bed of coked catalyst.

BRIEF DESCRIPTION OF THE DRAWINGS

Other aspects, objects, and advantages of this invention will become apparent from a study of the disclosure, appended claims, and the drawings in which:

DETAILED DESCRIPTION OF THE INVENTION

Figure 1:
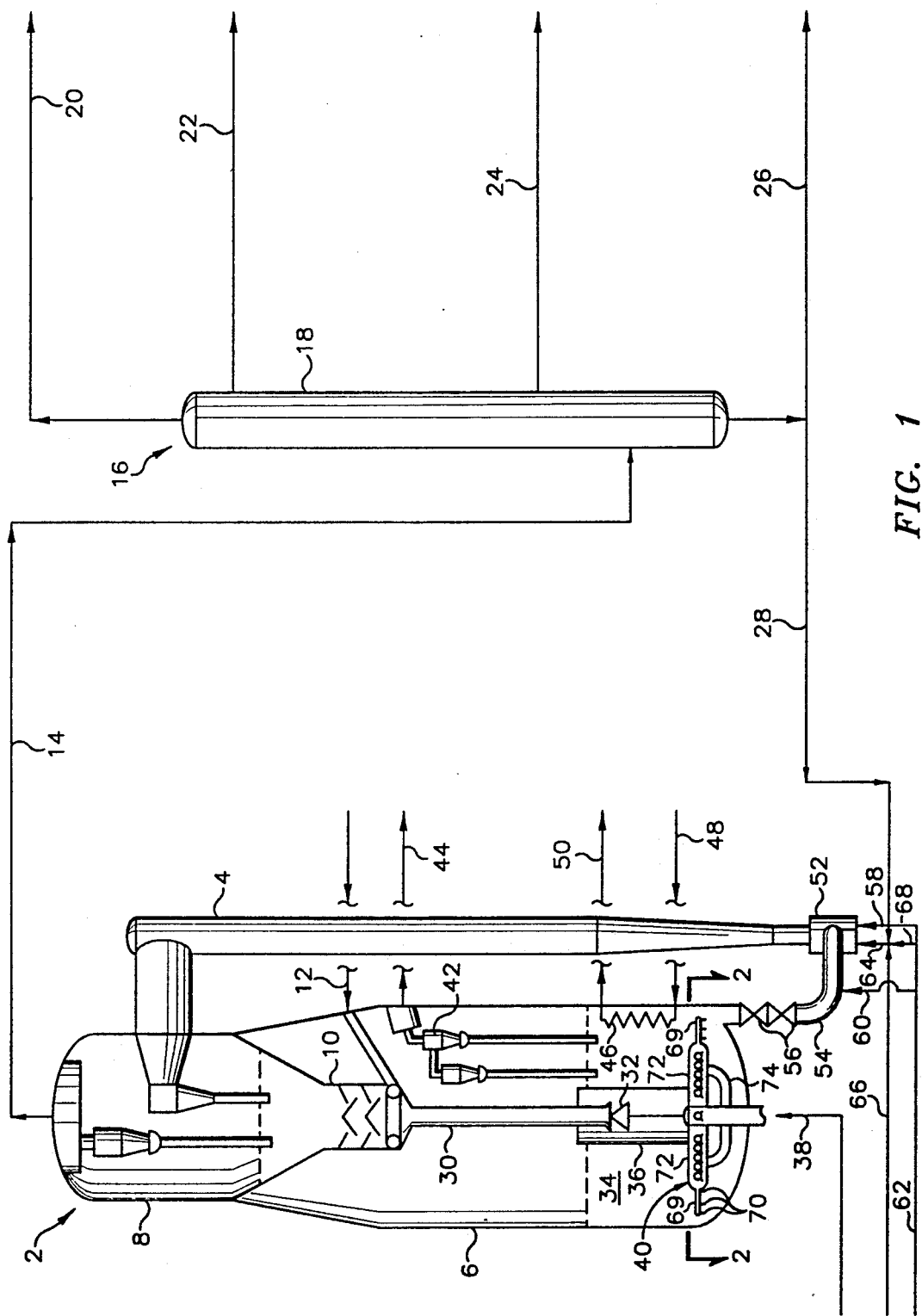
FIG. 1 schematically illustrates certain features of one type of catalytic cracking unit employing certain features of the present invention.

With reference to FIG. 1, one type of fluid catalytic catalyst cracking unit (FCCU) 2 comprises a riser-reactor 4, a regenerator 6, a catalyst/product separation zone or disengager 8, which usually contains several cyclone separators, and a stripping section or stripping zone 10 in which a gas, such as steam is introduced from line 12, strips entrained hydrocarbon from the coked catalyst. Overhead product from the separation zone 8 is conveyed via line 14 to a fractionation section 16 including a main fractionator 18 whereby the overhead product can be separated into various products. The overhead product of main fractionator 18, which passes by way of line 20 to a gas concentration section (not shown), generally includes gasoline range liquids, lighter hydrocarbons and non-hydrocarbon materials. The heavier liquid products are generally removed as side cuts from main fractionator 18 as shown by lines 22 and 24 with a naphtha ranged product being removed via line 22 and distillate ranged material, such as cycle oils, being withdrawn by line 24. The main fractionator 18 bottoms product is generally a slurry oil which can either be withdrawn as a product for fuel oil blending by line 26 or recycled to riser-reactor 4 by line 28.

After being stripped in stripping zone 10, the cracking catalyst is conveyed from stripping zone 10 to regenerator 6 by line or standpipe 30 for the purpose of coke burnoff. Flow of catalyst into regenerator 6 can be controlled by a plug valve 32 positioned under the outlet of the standpipe 30. The catalyst can be distributed from standpipe 30 into a dense phase fluidized bed 34 by flowing over a weir 36 positioned in regenerator 6. In regenerator 6, oxygen-containing gas, which is preferably air or an air/steam mixture, is introduced by line 38 and distributed by one or more gas distributors 40. Coke deposits are burned from the catalyst in regenerator 6 forming an effluent gas which is separated from the catalyst through a plurality of cyclone separators 42. These flue gases are withdrawn from regenerator 6 by line 44. Coil 46 in regenerator 6 is used to convert boiler feed water, introduced via line 48, into high pressure steam which is withdrawn via line 50.

Hot regenerated catalyst passes from regenerator 6 to a lift pot or lift zone 52 at the lower end of the riser-reactor 4 by conduit 54, which provides a source of hot, low carbon-containing cracking catalyst particles for riser-reactor 4. The flow rate of regenerated catalyst is controlled by valves 56 which are positioned in conduit 54, preferably in a vertical portion thereof. In lift zone 52, regenerated catalyst from conduit 54 is fluidized with a fluidizing gas, usually steam, which is introduced into lift zone 52 by either lines 58 or 60 connected to line 62 by which the steam source is conveyed. The oil feedstock is introduced into lift zone 52 via nozzle assembly 64 which is connected to a source of oil feedstock, such as a gas oil feed line 66, and the recycle line 28. Atomizing gas such as steam can be added to nozzle assembly 64 by line 68, for example, which connects nozzle assembly 64 to steam source 62.

The operating conditions for riser-reactor 4 and regenerator 6 can be conventional. Usually, the temperature in riser-reactor 4 will be in the range of from about 850° F. to about 1050° F.; preferably, for heavy oils, the temperature can range from about 925° F. to about 1025° F. The oil is usually admixed with steam at a weight ratio of oil-to-steam in the range from about 6:1 to about 25:1. A catalyst-to-oil weight ratio employed in riser-reactor 4 is generally in the range from about 2:1 to about 20:1, usually between about 2.1 and about 15:1, preferably between about 3:1 to about 10:1. Pressure in riser-reactor 4 is usually in the range of about 15 psia to about 60 psia (pounds per square inch absolute); preferably, for heavy oils, the pressure can be less than about 25 psia.

The cracking catalyst particles generally have a size in the range from about 20 microns to about 200 microns, usually from about 40 microns to about 80 microns, preferably about 60 microns. Flow velocity upward in the vertical section of riser-reactor 4 is generally in the range from about 10 feet per second to about 30 feet per second in the lower portion of riser-reactor 4 up to about 40 feet per second to about 120 feet per second in the upper portion of riser-reactor 4. The contact time between the catalyst and oil in riser-reactor 4 is generally in the range from about 0.25 seconds to about 4 seconds, usually from about 1 second to about 3 seconds when the oil is injected into the bottom of the riser. Preferably, contact times for heavy oils are less than about 2.5 seconds. The regenerator is generally operated at a temperature in the range from about 1100° F. to about 1450° F., and is ordinarily provided with sufficient oxygen-containing gas to reduce the coke on the catalyst to a level of about 0.5 weight percent or less, preferably less than 0.1 weight percent.

Any suitable catalyst may be used for practicing this invention. Examples of such catalysts suitable for catalytic cracking include, but are not limited to, silica-alumina or silica-magnesia synthetic microspheres or ground gels and various natural clay-type or synthetic gel-type catalysts. Most preferably, fluidizable zeolite-containing cracking catalysts are employed. Preferred catalysts can have a surface area in the range from about 50 $m^2/g$ to about 500 $m^2/g$ and a particle size in the range from about 40 microns to about 80 microns.

Figure 2:
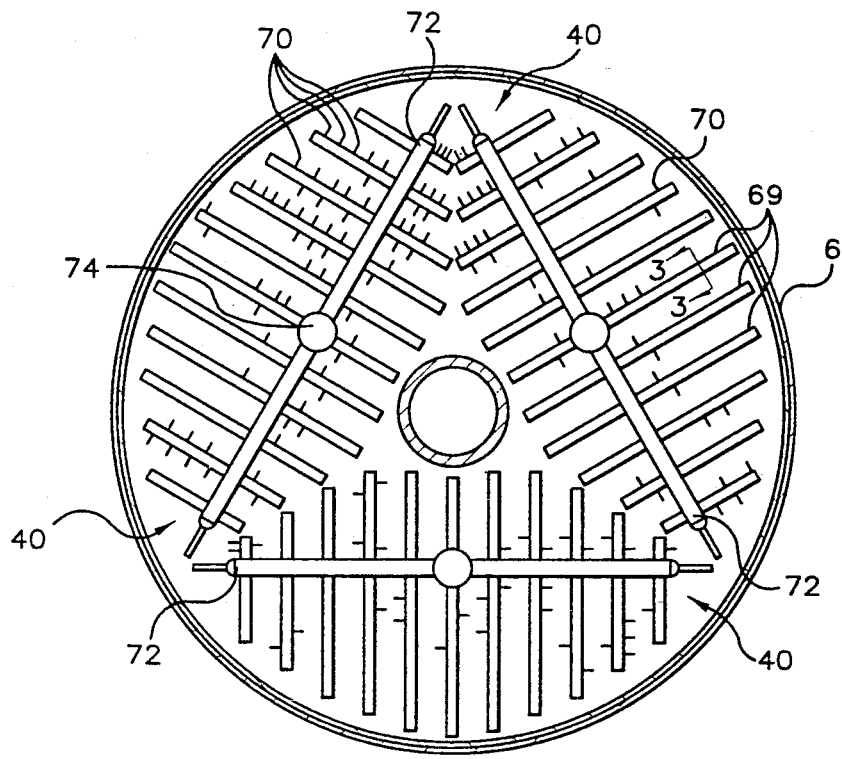
FIG. 2 illustrates a cross sectional view taken along line 2—2 of FIG. 1, and showing, among other things, a pipe grid constructed in accordance with the present invention for the distribution of combustion gas.

The present invention is applicable to any suitable catalyst regenerator for a catalytic cracking unit. The oxidant gas distributors 40 can be in any suitable configuration. Examples of such suitable configurations, include, but are not limited to, concentric perforated rings, christmas trees, grid plates, substantially straight pipe sections and any other type of air distribution apparatuses known in the art. Preferably the oxidant gas distributors 40 comprise substantially straight pipe sections as illustrated in FIG. 2. Preferably, the oxidant gas distributor 40 is formed from at least one generally horizontally positioned pipe or main air header 72 having lateral air conduits or laterals 69 with a plurality of nozzles 70 opening through the sidewall of the laterals 69 to the inside of regeneration vessel 6.

In FIG. 1, only one oxidant gas distributor 40 is illustrated for purposes of clarity. In FIG. 2 there is illustrated in a plan view a preferred embodiment of the invention wherein oxidant gas distributor 40 comprises a plurality of generally horizontally positioned main air headers 72 having plurality of generally horizontally positioned laterals 69 connected to each of the main air or gas headers 72 which have attached an oxidant gas supply source line 74. Oxidant gas is introduced into oxidant gas supply source line 74 through line 38. The oxidant gas supply source line 74, the main air headers 72 and the laterials 69 are operatively connected together so as to form a conduit for introducing oxidant gas into regenerator 6. The main gas headers 72 and laterals 69 are preferably formed from generally straight pipe sections.

The nozzles 70 in FIG. 2 illustrate only a small number of the nozzles which would be placed in a commercial unit. The illustrated nozzles 70 in FIG. 2 are patterned to represent eroded nozzles which were observed after a shutdown of a commercial catalyst regeneration unit to have severe erosion. In some of the nozzles, holes were found worn completely through the 1¼ inch Schedule 160, 304 stainless steel walls. These holes were generally located on the bottom side of the nozzles and where the nozzles were attached to the lateral. Most of the erosion appeared to be external on the underside tips of those nozzles pointing outward toward the regenerator walls. Primary areas where erosion was most prevalent were the nozzles on those laterals at the tailend of the main air headers and at the first nozzle on each lateral along the main air headers.

Figure 4:
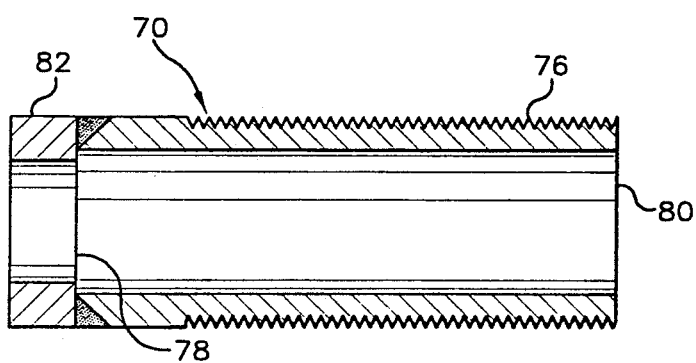
FIG. 4 is an enlarged partial cross sectional view taken along line 4—4 of FIG. 3 more clearly illustrating one embodiment of the combustion gas inles nozzle of the present invention.

It has been discovered that the erosion rate of nozzles 70 can significantly be reduced by imposing upon their outside surfaces a roughness which can be any type of pattern including, but not limited to, herringbone, checkered, serpentine, corrugated, fluted, serrated and other similar type patterns. A preferred roughness pattern for the outside surface of nozzle 70, however, is machined threads. A preferred embodiment of this invention is illustrated in FIG. 4, While FIG. 4 shows the preferred embodiment with nozzles 70 being formed from a generally straight, elongated circularly shaped pipe section, any suitable shape can be used for nozzle 70 including, for example, polygons and oval shapes. The outside surface of nozzle 70 is roughened by any suitable method to score the nozzle surface such as by machining, threading and engraving to provide a surface pattern which is preferably, but not necessarily, an external surface coarse machine type threads.

In the case where nozzle 70 is formed from a cylindrically shaped pipe section, any suitable diameter and length of such pipe may be used depending upon the desired combustion air flow conditions, such as gas volumetric flow velocity and the configuration of the gas distribution apparatus. So in the instant case, laterals 69 can be any shaped conduit which permits the distribution of combustion gas in any desirable flow pattern preferably with an essentially uniform gas distribution along the cross section of regenerator 6. It is generally preferred that lateral 69 be fabricated from cylindrically shaped pipe with a diameter depending upon various operating and design parameters. In one embodiment, the diameter of lateral 69 can range from about four inches to about ten inches; and more preferably, the diameter of lateral 69 can range from about six inches to about eight inches.

Figure 3:
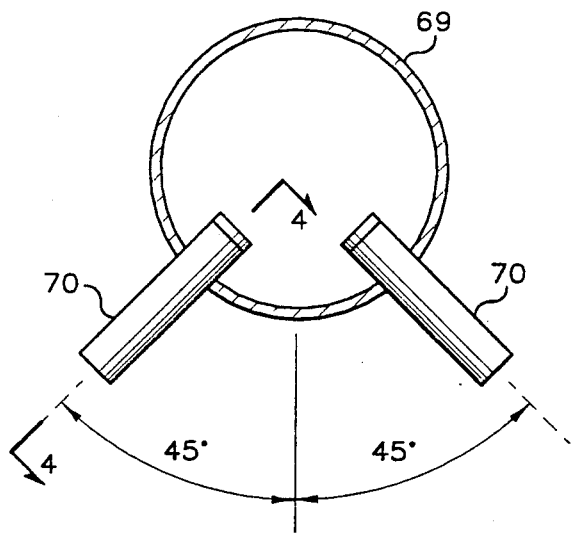
FIG. 3 is an enlarged partial cross sectional view taken along line 3—3 of FIG. 2 showing two combustion gas inlet nozzles used in conjunction with a combustion gas distribution apparatus constructed in accordance with the present invention.

The length of nozzles 70 can be any suitable length ranging from less than about one inch to greater than about twenty inches where the preferred length of nozzles 70 ranges from about four inches to about six inches. In the case where lateral 69 is designed to have the preferred dimension ranging from about six inches to about eight inches, it is most preferred that nozzle 70 have a length of about five inches. To further illustrate the design of nozzle 70, in FIG. 4 is provided a detailed illustration of a single, individual nozzle 70 and in FIG. 3 is a cross sectional view of lateral 69 having nozzles 70 attached or connected in a preferred orientation. Nozzle 70 can be manufactured from any desirable material, including, but not limited to, carbon steel, copper, monel, admiralty brass, alumina bronze, alumina, ceramic materials and the stainless steels. A preferred material, however, is type 304H stainless steel. Nozzle 70 has a first end or inlet end 78 and an outlet end 80. Fastened to the inlet end 78 is a donut shaped section or a generally annular flange 82 having an orifice which is sized preferably so that the combustion gas velocity through the orifice does not exceed the sonic velocity. Annular flange 82 is fastened to inlet end 78 in any suitable manner such as welding and casting.

In FIG. 3, it is shown that nozzle 70 is affixed to lateral 69 with inlet end 78 spaced from the inside wall of lateral 69 by approximately one inch. The positioning of inlet end 78, however, can vary, with its placement ranging from within close proximity of the inside wall of lateral 69 to a distance from the inside wall of lateral 69 of essentially the full length of nozzle 70. The nozzle 70 can be connected to lateral 69 by any suitable means including screwed connections, nuts and threads, and casting in place. A preferred method for attaching nozzle 70 is to cut holes from laterals 69 which allow the insertion of nozzles 70. Once the nozzles 70 are inserted and placed at the proper distances, they are back welded in place in a manner which provides a leak proof seal providing strength to the connection and which is shown as means 71 for connecting nozzles 70 to lateral 69. The angle of orientation of nozzles 70 is not a critical parameter of this invention. Nozzle 70 can be directed in any direction including upwardly, downwardly or sideways within regenerator 6 and they can be affixed normally to lateral 69 or at an oblique angle, if desired. In a preferred design as shown in FIG. 3, nozzles 70 are extended downwardly through the sidewall of lateral 69 in a generally normal angle to lateral 69 and at an angle of forty five degrees (45°) from the center line vertical of lateral 69.

EXAMPLE

The present invention was installed on an experimental basis in a Phillips Petroleum Company commercial fluidized catalytic cracking unit located in Sweeney, Tex. Both the prior art nozzles and nozzles manufactured to the novel nozzle design specification were installed on the laterals of the air distribution apparatus contained within the catalytic cracking unit catalyst regenerator. The regenerator was operating for a period of approximately nine months under typical operation conditions after which time the regenerator was shutdown for inspection and other unrelated maintenance work. Upon the inspection of the nozzles, it was unexpectedly found that there was essentially no wear, or very little wear, of the outside surface of the nozzles designed in accordance with this invention due to the erosive effects of the fluidized catalyst. The traditionally designed nozzles, however, exhibited a substantial amount of erosion which resulted in a failure rate of around ten percent of the nozzles per annum.

The improved nozzles that were installed in the regenerator were manufactured from a five (5) inch length of 1¼ inch schedule 160, 304H stainless steel pipe. Beginning at the outlet end of the pipe, and running for a length of four (4) inches along the outside surface of the nozzle, imposed were external coarse machine threads having eight (8) threads per inch. At the opposite end of the pipe, which was the inlet end, there was affixed a one-half (½) inch thick donut section orifice manufactured from a 304H stainless steel material having an inside diameter of 0.896 inches and an outside diameter of 1.66 inches, which was essentially identical to the outside diameter of the pipe section nozzle. To affix the donut section orifice to the nozzle, the nozzle inlet end was first beveled to a forty five degree (45°) angle. After bending the end of the nozzle, the donut shaped section orifice was placed against the nozzle end so that the center line of the inner orifice hole essentially matched up with the center line of the nozzle and so that the outside perimeter was essentially flush with the outside perimeter of the nozzle. The donut section orifice was permanently affixed to the nozzle by welding in place. The void created by the 45° bevel was filled by using a type E308-15 or 16 modified welding electrode. No metal preheat or postheat was used. Once the two pieces were welded together, the surface of the weld was ground so that it would be flush with the outside surfaces of the donut section orifice and the nozzle.

It is uncertain as to the reason why the presence of threads on the outside surface of the air distribution nozzles minimizes surface erosion and prolongs the useful life of the nozzle, however, the mechanism theorized is that the presence of void spaces upon the nozzle surface permit catalyst to fill the voids. As other catalyst within the turbulent fluidized catalyst bed impinges against the nozzle surface, the catalyst particles that have been retained within the void spaces of the nozzle surface is sacrifically worn away instead of the metal surface of the nozzles. In applying this mechanism in the design of an air distribution nozzle, any type of surface roughness pattern, including but not limited to, random patterns, bumps, corrugations, serrations, herringbone, and checkered patterns that are imposed by any method of scoring the surface such as engraving and machining will result in a reduction in the rate of wear of the distribution nozzles when they are used in a catalytic cracking unit regenerator; provided that, the void spaces are sufficiently large enough to allow the catalyst particles to fill such spaces. The surface voids should be such that catalyst particles ranging in size from about 20 microns to about 200 microns can fit within the void spaces formed on the nozzle.

The invention can be practiced, if desired, by introducing an oxygen-containing gas, preferably air, into a fluidized bed of cracking catalyst particles through the improved nozzles. These improved nozzles can have surface roughness patterns creating surface voids which permit catalyst particles within the fluidized catalyst bed of a catalytic regenerator to fill such voids during operation. With the surface voids of the improved nozzles being filled with catalyst particles, erosion of the surface metal of the nozzles is minimized by substituting catalyst erosion in place of metal erosion as the catalyst within the fluidized bed impinges against the nozzle surface.

Reasonable variations and modifications which will be apparent to those skilled in the art can be made in this invention without departure from the spirit and scope thereof.

That which is claimed is:

1. In a catalyst regeneration apparatus comprising:
a regenerator vessel;
means for introducing coked cracking catalyst into said regenerator vessel;
means for withdrawing regenerated cracking catalyst from said regenerator vessel;
at least one gas distributor having an internal wall and an external wall positioned in said regenerator vessel;
means for introduction of regeneration gas into said at least one gas distributor;
wherein the improvement comprises;
said at least one gas distributor is provided with a plurality of apertures;
a plurality of elongated nozzle elements respectively associated with each of said apertures with each of said elongated nozzle elements having an inlet end and an outlet end for passage of gas therethrough and on which the outside surface of each of said elongated nozzle elements having a roughness defined thereon, wherein said roughness defines void spaces upon the surface of said elongated nozzle elements wherein said void spaces are sufficient to permit the accumulation of catalyst particles of the size in the range of from about 20 microns to about 200 microns; and
means for connecting each of said elongated nozzle elements to its respective aperture of said at least one gas distributor whereby a conduit for passage of air is provided from said at least one gas distributor into said regenerator vessel.

2. In a catalyst regeneration apparatus as defined in claim 1, wherein said roughness is in the form of an external coarse machine thread.

3. In a catalyst regeneration apparatus as defined in claim 2, wherein said external coarse machine thread has a spacing of about eight threads per inch.

4. In a catalyst regeneration apparatus as defined in claim 1, wherein said roughness has a pattern selected from the group consisting of random patterns, bumps, corrugations, serrations, herringbone, and checkered patterns.

5. In a gas distribution apparatus, comprising:
an oxidant gas supply conduit having an inside wall and an outside wall;
a main air header conduit having an inside wall and an outside wall and which is operatively connected to said oxidant gas supply conduit so as to provide a conduit for passage of oxidant gas therethrough;
laterals having an inside wall and an outside wall operatively connected to said main air header conduit so as to provide a conduit for passage to oxidant gas therethrough and having a plurality of apertures defined therein;
a plurality of elongated nozzle elements respectively associated with each of said apertures with each of said elongated nozzle elements having an inlet end and an outlet end for passage of oxidant gas therethrough and upon which the outside surface of each of said elongated nozzle elements having a roughness defined thereon, wherein said roughness defines void spaces upon the surface of said elongated nozzle elements wherein said void spaces are sufficient to permit the accumulation of catalyst particles of the size in the range of from about 20 microns to about 200 microns; and
means for connecting each of said elongated nozzle elements to its respective aperture wherein said inlet end is positioned within said laterals and said outlet end is positioned away from said outside wall of said laterals and within a catalytic cracking regenerator vessel.

6. In a gas distribution apparatus as defined in claim 5, wherein:
said roughness is an external coarse machine thread form.

7. In a gas distribution apparatus as defined in claim 6, wherein said external coarse machine thread has a spacing of about eight threads per inch.

8. In a gas distribution apparatus as defined in claim 5, wherein said roughness has a pattern selected from the group consisting of random patterns, bumps, corrugations, serrations, herringbone, and checkered patterns.

* * * * *